(12) United States Patent
Bushey et al.

(10) Patent No.: US 7,224,790 B1
(45) Date of Patent: May 29, 2007

(54) METHOD TO IDENTIFY AND CATEGORIZE CUSTOMER'S GOALS AND BEHAVIORS WITHIN A CUSTOMER SERVICE CENTER ENVIRONMENT

(75) Inventors: Robert R. Bushey, Cedar Park, TX (US); John M. Martin, Austin, TX (US); Jennifer M. Mauney, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 09/578,723

(22) Filed: May 26, 2000

Related U.S. Application Data

(60) Provisional application No. 60/136,405, filed on May 27, 1999.

(51) Int. Cl.
*H04M 3/00* (2006.01)
(52) U.S. Cl. .............................. 379/265.13; 379/266.01
(58) Field of Classification Search ................ 379/266, 379/220, 212, 309, 265.01–265.14, 266.01–266.1; 705/1, 5, 6, 80, 400–500
See application file for complete search history.

(56) References Cited

U.S. PATENT DOCUMENTS

| | | | |
|---|---|---|---|
| 4,930,077 A | 5/1990 | Fan | |
| 5,181,259 A | 1/1993 | Rorvig | |
| 5,311,422 A | 5/1994 | Loftin et al. | |
| 5,323,452 A | 6/1994 | Dickman et al. | |
| 5,371,673 A | 12/1994 | Fan | |
| 5,495,567 A | 2/1996 | Iizawa et al. | |
| 5,553,119 A * | 9/1996 | McAllister et al. | ........... 379/67 |
| 5,566,291 A | 10/1996 | Boulton et al. | |
| 5,586,060 A | 12/1996 | Kuno et al. | |
| 5,586,171 A * | 12/1996 | McAllister et al. | ........... 379/67 |
| 5,615,323 A | 3/1997 | Engel et al. | |
| 5,633,909 A | 5/1997 | Fitch | |
| 5,659,724 A | 8/1997 | Borgida et al. | |
| 5,666,400 A | 9/1997 | McAllister et al. | |
| 5,671,351 A | 9/1997 | Wild et al. | |
| 5,684,870 A | 11/1997 | Maloney et al. | |
| 5,706,334 A | 1/1998 | Balk et al. | |
| 5,727,950 A | 3/1998 | Cook et al. | |

(Continued)

FOREIGN PATENT DOCUMENTS

WO 00/33548 6/2000

OTHER PUBLICATIONS

Card, S.K.; Moran, T.P.; and Newell A. (1983). *The Psychology of Human-Computer Interaction.* Hillsdale, NJ: Lawrence Erlbaum.

(Continued)

*Primary Examiner*—William J. Deane, Jr.
(74) *Attorney, Agent, or Firm*—Greenblum & Bernstein, P.L.C.

(57) ABSTRACT

A method is provided that identifies and categorizes the reason a customer contacts a customer service center, i.e. the customer's goal or problem. In addition, the method allows the customer to be categorized into a set of behavior-based groupings. This integration of goal and customer categorization establishes the foundation to optimally direct the customer's request through an appropriate center. This method can collect information regarding the customer's behavior and can use that behavioral information to determine the optimal manner for handling the customer request.

15 Claims, 1 Drawing Sheet

U.S. PATENT DOCUMENTS

| | | | |
|---|---|---|---|
| 5,729,600 A | 3/1998 | Blaha et al. | |
| 5,740,549 A | 4/1998 | Reilly et al. | |
| 5,757,644 A | 5/1998 | Jorgensen et al. | |
| 5,790,117 A | 8/1998 | Halviatti et al. | |
| 5,793,368 A | 8/1998 | Beer | |
| 5,794,193 A * | 8/1998 | Gorin | 704/250 |
| 5,802,526 A | 9/1998 | Fawcett et al. | |
| 5,806,060 A | 9/1998 | Borgida et al. | |
| 5,821,936 A | 10/1998 | Shaffer et al. | |
| 5,822,397 A | 10/1998 | Newman | |
| 5,825,869 A | 10/1998 | Brooks et al. | |
| 5,835,565 A | 11/1998 | Smith et al. | |
| 5,848,396 A | 12/1998 | Gerace | |
| 5,864,605 A | 1/1999 | Keshav | |
| 5,864,844 A | 1/1999 | James et al. | |
| 5,872,865 A | 2/1999 | Normile et al. | |
| 5,873,068 A | 2/1999 | Beaumont et al. | |
| 5,884,029 A | 3/1999 | Brush, II et al. | |
| 5,899,992 A | 5/1999 | Iyer et al. | |
| 5,903,641 A | 5/1999 | Tonisson | |
| 5,905,774 A | 5/1999 | Tatchell et al. | |
| 5,920,477 A | 7/1999 | Hoffberg et al. | |
| 5,923,745 A | 7/1999 | Hurd | |
| 5,953,406 A | 9/1999 | Larue et al. | |
| 5,963,965 A | 10/1999 | Vogel | |
| 5,974,253 A | 10/1999 | Nahaboo et al. | |
| 5,991,735 A | 11/1999 | Gerace | |
| 5,999,611 A | 12/1999 | Tatchell et al. | |
| 5,999,908 A | 12/1999 | Abelow | |
| 6,016,336 A | 1/2000 | Hanson | |
| 6,026,381 A | 2/2000 | Barton, III et al. | |
| 6,032,129 A | 2/2000 | Greef et al. | |
| 6,035,283 A | 3/2000 | Rofrano | |
| 6,035,336 A | 3/2000 | Lu et al. | |
| 6,038,560 A | 3/2000 | Wical | |
| 6,044,355 A | 3/2000 | Crockett et al. | |
| 6,052,693 A | 4/2000 | Smith et al. | |
| 6,058,163 A | 5/2000 | Pattison et al. | |
| 6,058,179 A | 5/2000 | Shaffer et al. | |
| 6,058,435 A | 5/2000 | Sassin et al. | |
| 6,061,433 A | 5/2000 | Polcyn et al. | |
| 6,067,538 A | 5/2000 | Zorba et al. | |
| 6,088,429 A | 7/2000 | Garcia | |
| 6,099,320 A | 8/2000 | Papadopoulos | |
| 6,104,790 A | 8/2000 | Narayanaswami | |
| 6,128,380 A | 10/2000 | Shaffer et al. | |
| 6,128,624 A * | 10/2000 | Papierniak et al. | 707/104.1 |
| 6,134,315 A * | 10/2000 | Galvin | 379/219 |
| 6,134,530 A | 10/2000 | Bunting et al. | |
| 6,148,063 A | 11/2000 | Brennan et al. | |
| 6,157,808 A | 12/2000 | Hollingsworth | |
| 6,160,877 A | 12/2000 | Tatchell et al. | |
| 6,161,130 A | 12/2000 | Horvitz et al. | |
| 6,163,607 A | 12/2000 | Bogart et al. | |
| 6,170,011 B1 | 1/2001 | Macleod Beck et al. | |
| 6,173,053 B1 | 1/2001 | Bogart et al. | |
| 6,173,261 B1 * | 1/2001 | Arai et al. | 704/257 |
| 6,173,279 B1 * | 1/2001 | Levin et al. | 707/5 |
| 6,201,948 B1 | 3/2001 | Cook et al. | |
| 6,208,970 B1 * | 3/2001 | Ramanan | 704/270 |
| 6,212,502 B1 * | 4/2001 | Ball et al. | 704/270 |
| 6,219,665 B1 | 4/2001 | Shiomi | |
| 6,230,197 B1 | 5/2001 | Beck et al. | |
| 6,236,395 B1 * | 5/2001 | Sezan et al. | 345/723 |
| 6,236,955 B1 | 5/2001 | Summers | |
| 6,236,990 B1 | 5/2001 | Geller et al. | |
| 6,243,375 B1 | 6/2001 | Speicher | |
| 6,249,579 B1 | 6/2001 | Bushnell | |
| 6,263,052 B1 | 7/2001 | Cruze | |
| 6,269,153 B1 * | 7/2001 | Carpenter et al. | 379/88.02 |
| 6,278,976 B1 | 8/2001 | Kochan | |
| 6,282,404 B1 | 8/2001 | Linton | |
| 6,289,084 B1 | 9/2001 | Bushnell | |
| 6,292,909 B1 | 9/2001 | Hare | |
| 6,295,551 B1 | 9/2001 | Robertz et al. | |
| 6,296,376 B1 | 10/2001 | Kondo et al. | |
| 6,308,172 B1 | 10/2001 | Agrawal et al. | |
| 6,330,326 B1 * | 12/2001 | Whitt | 379/265.13 |
| 6,332,154 B2 | 12/2001 | Beck et al. | |
| 6,014,638 A1 | 1/2002 | Burge et al. | |
| 6,336,109 B2 | 1/2002 | Howard | |
| 6,338,050 B1 * | 1/2002 | Conklin et al. | 705/80 |
| 6,349,290 B1 * | 2/2002 | Horowitz et al. | 705/35 |
| 6,353,661 B1 | 3/2002 | Bailey, III | |
| 6,353,825 B1 | 3/2002 | Ponte | |
| 6,357,017 B1 | 3/2002 | Bereiter et al. | |
| 6,366,879 B1 | 4/2002 | Coxhead et al. | |
| 6,374,260 B1 | 4/2002 | Hoffert et al. | |
| 6,389,400 B1 * | 5/2002 | Bushey et al. | 705/7 |
| 6,389,403 B1 | 5/2002 | Dorak, Jr. et al. | |
| 6,389,538 B1 | 5/2002 | Gruse et al. | |
| 6,400,807 B1 | 6/2002 | Hewitt et al. | |
| 6,405,149 B1 | 6/2002 | Tsai et al. | |
| 6,405,159 B2 * | 6/2002 | Bushey et al. | 703/13 |
| 6,405,170 B1 | 6/2002 | Phillips et al. | |
| 6,411,687 B1 * | 6/2002 | Bohacek et al. | 379/88.12 |
| 6,434,714 B1 | 8/2002 | Lewis et al. | |
| 6,483,523 B1 | 11/2002 | Feng | |
| 6,487,277 B2 | 11/2002 | Beyda | |
| 6,516,051 B2 | 2/2003 | Sanders | |
| 6,564,197 B2 * | 5/2003 | Sahami et al. | 706/55 |
| 6,587,127 B1 * | 7/2003 | Leeke et al. | 345/765 |
| 6,598,022 B2 | 7/2003 | Yuschik | |
| 6,618,715 B1 | 9/2003 | Johnson et al. | |
| RE38,649 E * | 11/2004 | Setlur et al. | 704/231 |
| 2001/0014863 A1 | 8/2001 | Williams, III | |
| 2001/0014868 A1 * | 8/2001 | Herz et al. | 705/14 |
| 2001/0041562 A1 | 11/2001 | Elsey et al. | |
| 2002/0055868 A1 | 5/2002 | Dusevic et al. | |
| 2002/0133394 A1 | 9/2002 | Bushey et al. | |
| 2002/0196277 A1 | 12/2002 | Bushey et al. | |
| 2003/0026409 A1 | 2/2003 | Bushey et al. | |
| 2003/0143981 A1 | 7/2003 | Kortum et al. | |
| 2003/0156133 A1 | 8/2003 | Martin et al. | |
| 2003/0156706 A1 | 8/2003 | Koehler et al. | |
| 2003/0158655 A1 | 8/2003 | Obradovich et al. | |
| 2004/0006473 A1 | 1/2004 | Mills et al. | |
| 2004/0032935 A1 | 2/2004 | Mills et al. | |
| 2004/0042592 A1 | 3/2004 | Knott et al. | |
| 2004/0240635 A1 | 12/2004 | Bushey et al. | |

OTHER PUBLICATIONS

Hart, S.G.; and Staveland, L.E. (1998). *Development of the NASA-TLX (Task Load Index): Result of Empirical and Theoretical Research*. In P.A. Hancock and N. Meshkati (Eds.), *Human Mental Workload*. (pp. 139-183) Amsterdam: North-Holland.

John, B.E.; and Kieras, D.E. (1996). Using GOMS for User Interface Design and Evaluation: Which technique? *ACM Transactions on Computer-Human Interaction*, 3 (4). 287-319.

Shingledecker, C.A. (1980). Operator Strategy: A Neglected Variable in Workload Assessment.

Wei, Z.G. (1997). *Mental Load and Performance at Different Automation Levels*. The Netherlands: Delft University.

Wierwille, W.W. and Eggemeier, F.T. (1993). Recommendations for Mental Workload Measurement in a Test and Evaluation Environment. *Human Factors*, 35 (2), 263-281.

Kellner, A. et al., "PADIS—An Automatic Telephone Switchboard and Directory Information System", Speech Communication, Oct. 1997.

Carpenter, B. et al., "Natural Language Call Routing: A Robust, Self-Organising Approach", Lucent Technologies Bell Laboratories, 1998.

"Lucent Technologies Announces Trial of Natural Language Call Routing Technology", press release, Dec. 3, 1997.

Riccardi, G. et al., "A Spoken Language System for Autmated Call Routing", IEEE International Conference on Acoustics, Speech, and Signal Processing, AT&T Bell Labs, 1997.

Liebermann, H., et al., "Let's Browse: A Collaborative Web Browsing Agent," Jan. 5, 1999.

Kelly, "From Intelligent Call Routing to Intelligent Contact Management," Call Center Solutions, v19, n3, Sep. 2000, 4 pages.

"Call Center Roundup," Teleconnect, Dec. 1998, 10 pages.

"Call Centers: sales, service and competitive advantage," Canadian Business, v70, n2, Feb. 1997, 8 pages.

Foster, "Advanced Definity call centers: Working for you and your customers, " AT&T Technology, v9, n2, Summer 1994, 7 pages.

Ameritech Corp., "Ameritech Phone-Based UI Standards: Dialogue Design", at www.ameritech.com/corporate/testtown/library/standard/pbix4.html, 1998.

InterVoiceBrite, Inc., "AgentConnect Call Center Platform Brochure", no date available.

"ACD Learning Center Tutorial Series", ACD Call Center Online Learning Center, <http://www.call-center.net/ivr-series.htm>.

"Customer Management Technology", TeleTech, <http://teletech.com/solutions/cmt.htm>, printed on Dec. 18, 2001.

"Products & Services - Interactive Voice Response (IVR)", Prairie Systems, <http://www.prairiesys.com/PSI/p_s_interactive_sol.htm>.

"RVS Voice", iMessaging Systems, Inc., <http://www.imessagingsystems.com/imsprods/rvsvoice/rvsvoice.htm>.

"What's Next in Interactive Voice Response", International Nortel Networks Meridian Users Group, <http://www.innmug.org/information/kirvan.html>, which was published in the Dec. 2000 issue of *InnTouch*.

* cited by examiner

METHOD TO IDENTIFY AND CATEGORIZE CUSTOMER'S GOALS AND BEHAVIORS WITHIN A CUSTOMER SERVICE CENTER ENVIRONMENT

CROSS-REFERENCE TO RELATED APPLICATIONS

The present application claims the benefit of U.S. Provisional Application No. 60/136,405, filed May 27, 1999, the subject matter of which is herein expressly incorporated by reference.

The present invention relates to a method described in commonly-assigned co-pending U.S. patent application Ser. No. 09/089,403, "A Method for Categorizing, Describing, and Modeling Types of System Users", filed Jun. 3, 1998, to R. Bushey et al. and to a method described in commonly-assigned co-pending U.S. patent application Ser. No. 09/303,622, "Methods for Intelligent Routing of Customer Requests Using Customer and Agent Models", filed May 3, 1999, to R. Bushey et al., the subject matter of both of which is expressly incorporated by reference herein in their entirety.

BACKGROUND OF THE INVENTION

1. Field of the Invention

The present invention relates to the identification and categorization of customer's goals when contacting a customer service center. In particular the present invention relates to the field of integrating customer behavioral models with the handling of customer requests.

2. Description of Background Information

The common knowledge and practice in the industry is to allow customers to map their goal to an organizational unit and, thus, determine which service center would best handle their goal. The customer typically does this with center information provided from the telephone directory or the bill. For example, some of the center information provided in the telephone directory include "to order or move your home telephone service", "for questions about your bill", and "residence repair". After the customer has contacted the center they believe is most appropriate to accomplish their goal, the customer typically has to use an IVR (Interactive Voice Response) system or a similar system to accomplish his/her intended goal. Based on the choice of the intended goal, a system is used to direct the customer to the appropriate center. The customer and the agent determine if the customer's goal can be appropriately handled at that center or if the customer needs to be transferred to another, more appropriate location.

Currently, customers use the telephone to present their goals. When the customer makes a call, some call centers may split off incoming customer calls to a dedicated agent group when the customer has a specific language preference. Some call centers also split off customer calls that originate from residences separate from customer calls that originate from businesses. In addition, some call centers split customer calls where the customer wishes to place an order for a service separate from the customer calls where the customer wishes additional information on their bill or similar information.

Whether a call center performs any preliminary routing or not, none of the call centers route customer calls to agents with a conditional probability. They also do not categorize the customers' behaviors and model those categorized behaviors. In addition, many service centers now handle customer requests through the telephone, while future technology will allow customers to accomplish their goals through a variety of channels beyond the telephone.

The ideal customer handling system is designed with full and complete knowledge of functionality, technology, and customer requirements. While functionality and technology issues are represented well, a full, rich understanding of the customers and their goal statements are not well understood. In fact, the common assumption is that the customer's comments are similarly stated and, thus, a single view of the customer population can be taken. This single view approach limits the performance of an implemented customer service system because not all of the customer comments are similarly stated, and thus handled appropriately. Therefore, the implemented system may function well for certain customers, while being inappropriate for other customers. When overall performance is critical, these mishandled customer contacts can cost organizations time and money.

An improved approach to this situation is to not take a single view of the customers, but rather to examine the customers' comments and the verbal styles in which the comments are presented. The comments represent the goal of the customer and can be attained through a predicate analysis.

DETAILED DESCRIPTION OF THE INVENTION

Figure 1:
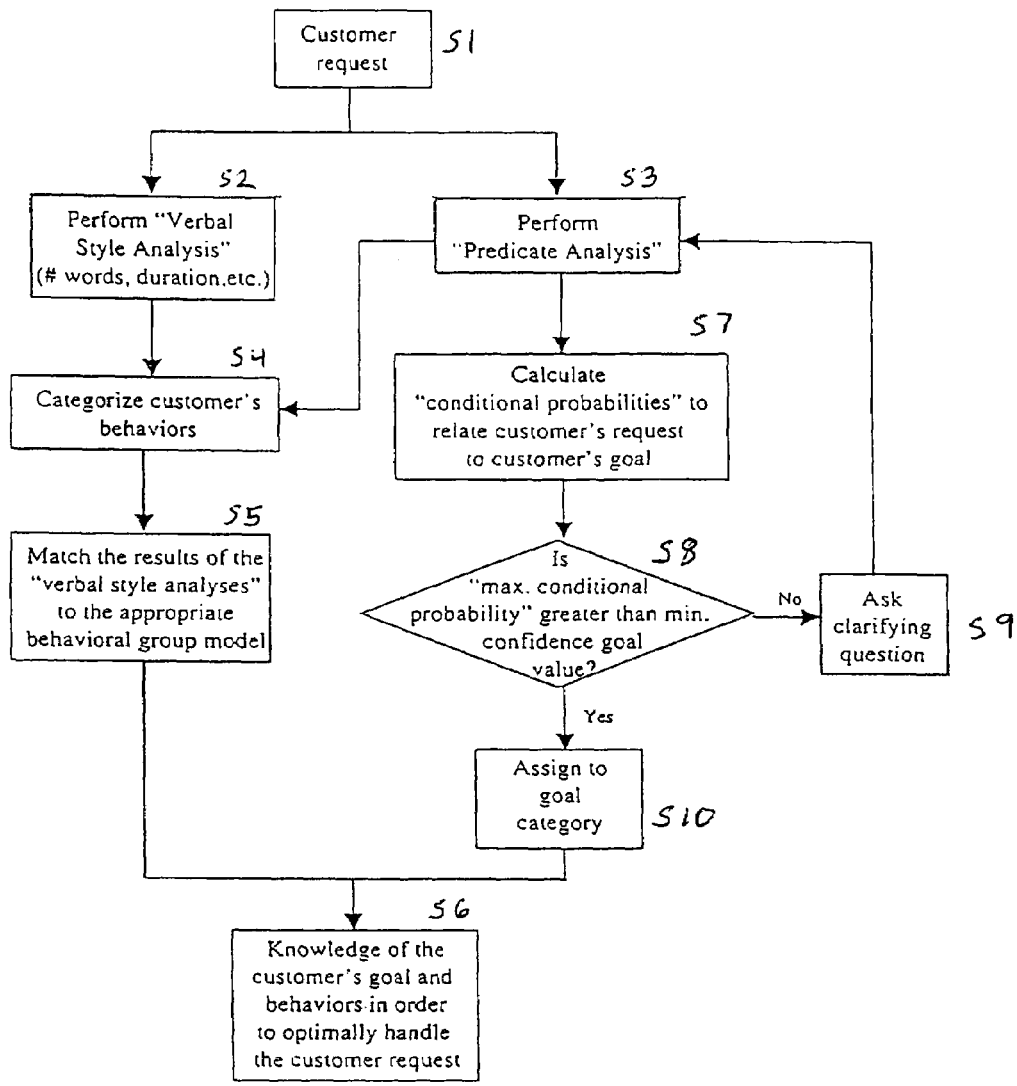
FIG. 1 illustrates a flowchart of the Customer Goal and Behavior Categorization Method, according to an aspect of the present invention.

The present invention contributes to the identification and categorization of customer's goals, when contacting a customer service center. This invention also integrates customer behavioral models with the handling of customer requests. None of the prior art contains customer goal identification and customer behavioral models.

U.S. patent application Ser. No. 09/089,403, filed Jun. 3, 1998, entitled "A Method for Categorizing, Describing, and Modeling Types of System Users" (referred to as "CDM") focuses on the categorization, describing and modeling of agents and customers. The method of the present invention incorporates some aspects of the CDM patent into the categorization of the customers. However, the present method also facilitates the determination of the customer's goal through predicate analyses and conditional probabilities.

The method of the present invention differs from provisional U.S. Patent Application No. 60/097,174, filed on Aug. 20, 1998 entitled "A Method for Intelligent Call Routing Utilizing A Performance Optimizing Calculation Integrating Customer and Agent Behavioral Models" in that the disclosed method is not a call routing method. The present method focuses on the reason a customer contacts a service center, i.e. their goal, and integrates this information into a complete view of the customer. The present method takes a broader view of customer channels by considering more than just the telephone.

A primary contribution of this invention is the conditional probability calculation to assign the appropriate goal category to the customer's request. No prior art contains a conditional probability calculation used to categorize the customer's request.

According to an aspect of the present invention, the method for identifying and categorizing customer goals for contacting a service center is provided which includes receiving a customer request; performing at least one of a verbal style analysis and a predicate analysis on the customer's request to identify one of a customer behavior and a goal for the customer; and assigning the customer request to a service center associated with the identified one of customer behavior and customer goal. The method includes categorizing the customer behavior into one of a plurality of groups, and matching a result of the verbal style analysis to an appropriate model with the categorized group.

According to another aspect of the present invention, the method may also include performing a predicate analysis which includes calculating conditional probabilities that relate the customer request to customer goal categories; comparing a maximum conditional probability obtained from the calculated conditional probabilities with a minimal set value; and mapping the customer request to a customer goal category related to the maximum conditional probability if the maximum conditional probability is equal to or greater than the minimal set value.

In another aspect of the present invention, the predicate analysis of the method may include calculating conditional probabilities that relate the customer request to customer goal categories; comparing a maximum conditional probability obtained from the calculated conditional probabilities with a minimal set value; asking a clarifying question if the maximum conditional probability is less than the maximum conditional probability; and subsequently performing the predicate analysis on the customer's request based on the answer to the clarifying question.

According to a further aspect of the present invention, the predicate analysis may include calculating conditional probabilities that relate the customer request to customer goal categories; comparing a maximum conditional probability obtained from the calculated conditional probabilities with a minimal set value; and mapping the customer request to a customer goal category related to the maximum conditional probability if the maximum conditional probability is equal to or greater than the minimal set value.

In another aspect of the present invention, the predicate analysis may be performed by asking a clarifying question if the maximum conditional probability is less than the maximum conditional probability; and subsequently performing the predicate analysis on the customer's request based on the answer to the clarifying question.

According to a still further aspect of the present invention, a method is provided for identifying and categorizing customer goals for contacting a service center, wherein the method includes: receiving a customer request; performing at least one of a verbal style analysis and a predicate analysis on the customer's request to identify a customer behavior and a goal for the customer; categorizing the customer behavior into one of a plurality of behavioral groups; matching a result of the verbal style analysis to an appropriate behavioral group model; calculating conditional probabilities that relate the customer's request to respective customer goal categories; comparing a maximum conditional probability obtained from the calculated conditional probabilities with a minimal set value; mapping the customer request to a customer goal category; and assigning the customer request to a service center associated with a respective one of the behavioral group model and the mapped customer goal category.

Further aspects of the invention include mapping the customer's goal to a respective goal category if the conditional probability for the customer's goal is equal to or greater than a minimal set value, and asking the customer a clarifying question if the conditional probability for the customer's goal is equal to or greater than the minimum set value for goal categories related to more than one location.

According to other aspects of the present invention, if the conditional probability for the customer's goal is less than the minimum set value for the goal categories, a clarifying question is asked to the customer, and if a clarifying question is asked to the customer based on the customer's answer, a new predicate analysis is performed and new conditional probabilities for the customer's goal are calculated by comparing the maximum conditional probability against the minimum confidence goal value.

Further aspects of the present invention include expressing the receiving customer request through an interactive voice response system; expressing the receiving customer request through a question typed on a computer via an Internet connection; and expressing the receiving customer request through a question directly to a human operator via telephone.

According to another aspect of the present invention, the method may include performing verbal style analysis with respect to number of words used, types of words used, duration of comment, and method of contact. Also, the present invention includes performing predicate analysis on the customer's request to identify a customer behavior for the customer is based upon key words used by said customer, specific types of words the customer uses, and language components.

According to a further aspect of the present invention, the method may also include categorizing the customer behavior into one of a plurality of groups includes at least one of the groups comprising similar behaviors and at least one of the groups comprising different behaviors between the plurality of groups, and calculating conditional probabilities that relate the customer request to customer goal categories comprises a score that indicates how well said customer goal is matched to the respective goal category.

According to a still further aspect of the invention, a method is provided which includes: receiving a customer request; performing at least one of a verbal style analysis and a predicate analysis on the customer's request to identify one of a customer behavior and a goal for the customer; the performing verbal style analysis includes analysis with respect to number of words used, types of words used, duration of comment, and method of contact, and performing predicate analysis on the customer's request to identify a customer behavior for the customer is based upon key words used by the customer, specific types of words the customer uses, and language components.

The method may further include categorizing the customer behavior into one of a plurality of behavioral groups, wherein categorizing the customer behavior into one of a plurality of groups may include at least one of the groups having similar behaviors and at least one of said groups having different behaviors between the plurality of groups. Thereafter, a result of the verbal style analysis is matched to an appropriate behavioral group model, conditional probabilities that relate the customer's request to respective customer goal categories are calculated, and wherein the conditional probability is a score that indicates how well the customer goal is matched to respective said goal category.

The method may further include comparing a maximum conditional probability obtained from the calculated conditional probabilities with a minimal set value and mapping the customer request to a customer goal category, wherein if the conditional probability for the customer's goal is equal to or greater than a minimal set value, the customer's goal is mapped to a respective goal category. If the conditional probability for the customer's goal is equal to or greater than the minimum set value for goal categories related to more than one location, a clarifying question is asked to the customer, if the conditional probability for the customer's goal is less than the minimum set value for the goal categories, a clarifying question is asked to the customer, and if a clarifying question is asked to the customer based on the customer's answer, a new predicate analysis is performed and new conditional probabilities for the customer's goal are calculated by comparing the maximum conditional probability against the minimum confidence goal value, and the customer request is assigned to a service center associated with the mapped customer goal category.

According to another aspect of the present invention, a computer program is provided for identifying and categorizing customer goals for contacting a service center stored on a computer readable medium wherein the program may include codes for receiving a customer request, performing at least one of a verbal style analysis and a predicate analysis on the customer's request to identify one of a customer behavior and a goal for the customer, categorizing the customer behavior into one of a plurality of groups, and matching a result of the verbal style analysis to an appropriate model with the categorized group.

The program may further include calculating conditional probabilities that relate the customer request to customer goal categories, comparing a maximum conditional probability obtained from the calculated conditional probabilities with a minimal set value. If the conditional probability for the customer's goal is equal to or greater than a minimal set value, the customer's goal is mapped to a respective said goal category, if the conditional probability for the customer's goal is equal to or greater than the minimum set value for goal categories related to more than one location, a clarifying question is asked to the customer, if the conditional probability for the customer's goal is less than the minimum set value for the goal categories, a clarifying question is asked to the customer, and the customer request is assigned to a service center associated with the identified one of customer behavior and customer goal.

An objective of the present invention is to establish a method that identifies and categorizes a customer's goal and the customer's verbal style used to present that goal. The method then determines the conditional probability in which that particular goal matches a given goal category. Based on that conditional probability, the customers goal is then assigned to the appropriate goal category. If the conditional probability does not meet the minimum confidence goal value, a clarifying question is used to better determine the customer's goal. The conditional probability is then recalculated and compared to the minimum confidence goal value. The method also categorizes the customer into a behavior-based grouping, matches the customers' behavior to the appropriate customer model, and assigns that information to the same category determined from the conditional probability. The implemented customer goal and the behavior handling system will have a higher level of performance compared to systems that do not incorporate this method.

The present invention uses a predicate analysis on the customer comments. Based on the predicate analysis, conditional probabilities are determined for the customer comments as related to each of the possible goal categories. The goal category that results in the maximum conditional probability is then examined against the minimum confidence goal value. The minimum confidence goal value represents the lowest number in which the confidence of the goal category is at an acceptable level. If the maximum conditional probability is less than the minimum confidence goal value, a clarifying question is used to better determine the customer's goal. The conditional probabilities are recalculated and if the maximum conditional probability is greater than the minimum confidence goal value, the customer/comments are considered to be identified and, thus, can be handled appropriately and at the appropriate center. If the maximum conditional probability is less than the minimum confidence goal value, another clarifying question is used to better determine the customer's goal. If the maximum conditional probability is still less than the minimum confidence goal value after a set of clarifying questions, the customer/comments are considered to be unknown and will be handled appropriately.

The customer comments also offer behavioral aspects of the customer through the verbal style used by the customer. For example, loquacious customers who describe a story rather than stating just the goal have a different behavior than customers whom clearly and succinctly state the goal. Thus, a verbal style analysis is used to facilitate the behavioral categorization of the customers. It could include analysis on the number of words used in the comments, the duration of the comments, key words used, etc. Additional analysis could also be examined, for example, the type of contact method used by the customer (i.e., talking on the telephone, typing on a computer and using the Internet, talking in person, etc.). These are important factors in determining how to behaviorally categorize the customer.

FIG. 1 illustrates the customer behavior information and goal modeling method. The customer first expresses the goal (or problem) they are trying to achieve or complete, which is identified at S1 as a "customer request". The customer may express the goal through any appropriate medium, for example, an IVR system, a question on the Internet, directly to a human operator, or through some other channel or format.

Two types of analyses are then performed on the customer's comments, namely, verbal style analyses as indicated at S2 and predicate analyses as indicated at S3. The verbal style analyses would include, for example, the number of words used, types of words used, duration of comment, etc. In addition, these analyses would also include the method of contact (i.e., talking on the telephone, typing on a computer and using the Internet, talking in person, etc.).

After the verbal style analyses are performed, the customer's behavior is then categorized into one of a limited number of groups as indicated at S4. Next, the customer is matched to the appropriate behavioral model of the categorized group as indicated at S5. The customer's analyses and the corresponding model are then handled with the customer/comments to the final location as indicated at S6.

In the other flow shown in FIG. 1, a predicate analysis is performed on the customer's comments as indicated at S3. This analysis would be based on a variety of analyses including, for example, the key words the customer uses, the specific types (e.g., verb, object, etc.) of words the customer uses, the language components, etc. The predicate analysis is expected to facilitate the determination of the customer's goal. The predicate analysis can also facilitate the categorization of the customer into a behavioral group because the content of the customer comments may be specific to a particular group as indicated at S4.

Next, a conditional probability is determined for the customer goal as it relates to the goal categories as indicated at S7. The conditional probability is a score that indicates how well that particular customer goal is matched to a particular goal category. If the conditional probability for the customer's goal is equal to or greater than some minimal set value at S8, then the customer's goal is mapped to that goal category as indicated at S10. If the conditional probability for the customer's goal is equal to or greater than the minimum set value for goal categories related to more than one location at S8, a clarifying question is asked to the customer as indicated at S9. If the conditional probability for the customer's goal is less than the minimum set value for the goal categories, a clarifying question is asked to the customer.

If a clarifying question is asked to the customer at S9, based on the customer's answer, a new predicate analysis is performed at S3 and new conditional probabilities for the customer's goal are calculated. The maximum conditional probability will be examined against the minimum confidence goal value at S8.

After the customer's goal has been mapped to the appropriate goal category, the customer/comments are then handled at the location associated with the appropriate goal category.

Accordingly, the advantages of the present invention are primarily focused on improved operating performance. This means that the method of the present invention will allow the customer's goals to be better understood and, thus, a customer service center will be better able to accomplish those goals. This more efficient goal accomplishment benefits both the customer and the user of the present invention. Also, additional customer information and characteristics will be gained.

The current practice is to allow the customers to determine the best center to contact. This invention allows the customer to be handled based on the goals of the customer so that the match between customer goals and the center to accomplish those goals are optimized. The overall performance of the centers will improve with this goal identification method because each of the customer requests will be handled by the most appropriate center. Another advantage of the method of the present invention will be that the customers will have a higher level of satisfaction with the treatment and handling of their request because the agent/section will be better suited for their particular goal.

A summary of benefits to the user of the disclosed invention are listed below: (1) revenue generated per customer call should increase (fewer misdirects); (2) agents can out-perform other similar agents at other organizations; (3) other organizations would still be attempting to force all of their agents into determining the goals of the customer and then deciding if those goals could be appropriately handled in the location; (4) the present invention provides an important tool for obtaining and retaining customers; and (5) the present invention is a method which customers are expected to appreciate; it gives customers a reason to enhance their opinion of the user of the invention as a company that adjusts to their needs and capabilities; thus, the user of the invention becomes the carrier of choice.

Although the invention has been described with reference to several embodiments, it is understood that the words that have been used are words of description and illustration, rather than words of limitation. The method disclosed can be used to identify and categorize the reason a customer contacts a customer service center on a variety of systems, including but not limited to interactive voice response systems, information input into a computer system via the Internet, computer systems, and any other system which a service center may use.

While the invention has been described with reference to a preferred embodiment, it is understood that the words which have been used herein are words of description and illustration, rather than words of limitations. Changes may be made, without departing from the scope and spirit of the invention in its aspects. Although the invention has been described herein with reference to methods and means, the invention is not intended to be limited to the particulars disclosed herein; rather, the invention extends to all functionally equivalent methods and uses.

What is claimed is:

1. A method for identifying and categorizing customer goals for contacting a service center comprising:
   receiving a customer request;
   performing a verbal style analysis on the customer's request to identify a customer behavior for the customer, said verbal style analysis including performing an analysis with respect to a count of a number of words used, and a method of contact;
   categorizing the customer behavior into one of a plurality of behavioral groups;
   calculating conditional probabilities that relate the customer request to customer goal categories;
   comparing a maximum conditional probability obtained from the calculated conditional probabilities with a minimal set value;
   mapping the customer request to a customer goal category related to the maximum conditional probability if the maximum conditional probability is equal to or greater than the minimal set value; and
   assigning the customer request to a service center associated with both the identified customer behavior and the mapped customer goal category.

2. The method according to claim 1, the method further comprising:
   receiving the customer request via an interactive voice response system.

3. The method according claim 1, the method further comprising:
   receiving the customer request via an Internet connection.

4. The method according claim 1, the method further comprising:
   receiving the customer request via telephone.

5. The method according to claim 1, further comprising matching a result of the verbal style analysis to an appropriate model with the categorized group.

6. A method for identifying and categorizing customer goals for contacting a service center comprising:
   receiving a customer request;
   performing a verbal style analysis on the customer's request to identify a customer behavior for the customer, the verbal style analysis including counting a number of words used and performing an analysis of the number of words counted;
   categorizing the customer behavior into one of a plurality of behavioral groups;
   calculating conditional probabilities that relate the customer request to customer goal categories;
   comparing a maximum conditional probability obtained from the calculated conditional probabilities with a minimal set value;
   mapping the customer request to a customer goal category related to the maximum conditional probability if the maximum conditional probability is equal to or greater than the minimal set value; and assigning the customer request to a service center associated with both the identified customer behavior and the mapped customer coal category.

7. The method according to claim 6, the method further comprising:

receiving the customer request via an interactive voice response system.

8. The method according claim 6, the method further comprising:

receiving the customer request via an Internet connection.

9. The method according claim 6, the method further comprising:

receiving the customer request via telephone.

10. The method according to claim 6, further comprising matching a result of the verbal style analysis to an appropriate model with the categorized group.

11. A computer readable medium storing a program for identifying and categorizing customer goals for contacting a service center, comprising:

a receiving code segment that receives a customer request;

an analysis code segment that performs a verbal style analysis on the customer's request to identify a customer behavior for the customer, the verbal style analysis including counting a number of words used and performing an analysis of the number of words counted;

a categorizing code segment that categorizes the customer behavior into one of a plurality of behavioral groups;

a goal identifying code segment that calculates conditional probabilities that relate the customer request to customer goal categories, compares a maximum conditional Probability obtained from the calculated conditional probabilities with a minimal set value, and maps the customer request to a customer goal category related to the maximum conditional probability if the maximum conditional probability is equal to or greater than the minimal set value; and an assignment code segment that assigns the customer request to a service center associated with both the identified customer behavior and the mapped customer goal category.

12. The medium according to claim 11, in which the receiving code segment receives the customer request via an interactive voice response system.

13. The medium according to claim 11, in which the receiving code segment receives the customer request via an Internet connection.

14. The medium according to claim 11, in which the receiving code segment receives the customer request via telephone.

15. The medium according to claim 11, further comprising a matching code segment that matches a result of the verbal style analysis to an appropriate model with the categorized group.

* * * * *

UNITED STATES PATENT AND TRADEMARK OFFICE
CERTIFICATE OF CORRECTION

PATENT NO. : 7,224,790 B2  Page 1 of 2
APPLICATION NO. : 09/578723
DATED : May 29, 2007
INVENTOR(S) : Bushey et al.

It is certified that error appears in the above-identified patent and that said Letters Patent is hereby corrected as shown below:

On page 1, under References Cited, of the printed patent, the prior art referenced in the Information Disclosure Statement and listed in the attached 1449, filed on August 28, 2000 and considered by the Examiner on June 10, 2003, should be included. Accordingly the following should be added at paragraph [56] under U.S. Patent documents:

5 943 416 08/24/99 GISBY
5 870 308 02/09/99 DANGELO et al.
5 832 430 11/03/98 LLEIDA et al.
5 832 428 11/03/98 CHOW et al.
5 825 856 10/20/98 PORTER et al.
5 822 744 10/13/98 KESEL
5 819 221 10/06/98 KONDO et al.
5 812 975 09/22/98 KOMORI et al.
5 809 282 09/15/98 COOPER et al.
5 808 908 09/15/98 GHAHRAMANI
5 771 276 06/23/98 WOLF
5 758 257 05/26/98 HERZ et al.
5 734 709 03/31/98 DEWITT et al.
5 710 884 01/20/98 DEDDRICK et al.
5 684 872 11/04/97 FLOCKHART et al.
5 675 707 10/07/97 GORIN et al.
5 668 856 09/16/97 NISHIMATSU et al.
5 657 383 08/12/97 GERBER et al.
5 600 781 02/04/97 ROOT et al.
5 561 711 10/01/96 MULLER
5 537 470 07/16/96 LEE
5 594 791 01/14/97 SZLAM et al.
5 586 219 12/17/96 YUFIK
5 535 321 07/09/96 MASSSARO et al.
5 533 107 07/02/96 IRWIN et al.
5 530 744 06/25/96 CHARALAMBOUS et al.

Signed and Sealed this

Eighteenth Day of May, 2010

David J. Kappos
*Director of the United States Patent and Trademark Office*

5 519 772 05/21/96 AKMAN et al.
5 500 795 03/19/96 POWERS et al.
5 479 488 12/26/95 LENNIG et al.
5 420 975 05/30/95 BLADES et al.
5 388 198 02/07/95 LAYMAN et al.
5 335 269 08/02/94 STEINLICHT
5 335 268 08/02/94 KELLY, JR. et al.
5 327 529 07/05/94 FULTS et al.
5 299 260 03/29/94 SHAIO
5 263 167 11/16/93 CONNER, JR. et al.
5 206 903 04/27/93 KOLER et al.
5 204 968 04/20/93 PARTHASARATHI
5 115 501 05/19/92 KERR
4 964 077 10/16/90 EISEN et al.
4 922 519 05/01/90 DAUDELIN
4 761 542 08/02/88 KUBO et al.
4 694 483 09/15/87 CHEUNG
4 310 727 01/12/82 LAWS ER

At column 9, line 5 (claim 6 line 22) of the printed patent, the word "coal" should be --goal--. This is stated correctly on page 3, line 23 of Applicant's Amendment filed on April 21, 2006.

At column 9, line 19 (claim 11 line 1) of the printed patent, "storing a program" should be --storing a computer program--. This is stated correctly on page 2, line 10 of Examiner's Amendment mailed July 25, 2006.